No. 717,707. PATENTED JAN. 6, 1903.
H. McINTOSH.
BRICK MACHINE.
APPLICATION FILED JAN. 10, 1901. RENEWED JULY 3, 1902.
NO MODEL. 8 SHEETS—SHEET 1.

Fig. 1.

Witnesses
Inventor
Henry McIntosh
By H. B. Willson & Co.
Attorneys

No. 717,707. PATENTED JAN. 6, 1903.
H. McINTOSH.
BRICK MACHINE.
APPLICATION FILED JAN. 10, 1901. RENEWED JULY 3, 1902.
NO MODEL. 8 SHEETS—SHEET 3.

Witnesses
Inventor
Henry McIntosh
By H. B. Willson & Co.
Attorneys

No. 717,707. PATENTED JAN. 6, 1903.
H. McINTOSH.
BRICK MACHINE.
APPLICATION FILED JAN. 10, 1901. RENEWED JULY 3, 1902.
NO MODEL. 8 SHEETS—SHEET 6.

Witnesses
Inventor
Henry McIntosh
By H. B. Willson & Co
Attorneys

No. 717,707. PATENTED JAN. 6, 1903.
H. McINTOSH.
BRICK MACHINE.
APPLICATION FILED JAN. 10, 1901. RENEWED JULY 3, 1902.
NO MODEL. 8 SHEETS—SHEET 7.

Witnesses
Inventor
Henry McIntosh
By H. B. Willson & Co
Attorneys

No. 717,707. PATENTED JAN. 6, 1903.
H. McINTOSH.
BRICK MACHINE.
APPLICATION FILED JAN. 10, 1901. RENEWED JULY 3, 1902.
NO MODEL. 8 SHEETS—SHEET 8.

Witnesses Inventor
Henry McIntosh
By H. B. Willson & Co.
Attorneys

UNITED STATES PATENT OFFICE.

HENRY McINTOSH, OF SARNIA, CANADA, ASSIGNOR OF TWO-THIRDS TO R. E. MOSS, OF PORT HURON, MICHIGAN.

BRICK-MACHINE.

SPECIFICATION forming part of Letters Patent No. 717,707, dated January 6, 1903.

Application filed January 10, 1901. Renewed July 3, 1902. Serial No. 114,300. (No model.)

*To all whom it may concern:*

Be it known that I, HENRY McINTOSH, a subject of the Queen of Great Britain, residing at Sarnia, in the Province of Ontario and Dominion of Canada, have invented certain new and useful Improvements in Brick-Machines; and I do declare the following to be a full, clear, and exact description of the invention, such as will enable others skilled in the art to which it appertains to make and use the same.

The invention relates to brick-machines, and more particularly but not necessarily to machines for pressing what is known in the art as "sand brick."

The object of the invention is to provide a machine of this character which will be entirely automatic in its operation from the moment the material to be pressed is placed in the molds until the complete brick has been pressed and discharged onto the delivery-table; furthermore, to provide a machine of this character in which the mold in its movement under the filling-box will automatically operate the cut-off to allow the material in said box to discharge into said mold and when the mold has been filled and is in the act of retreating will automatically cut off the supply in said box; furthermore, to provide a vertically-movable guide which when the mold has been moved to the proper position under the plunger and the material in the mold pressed is adapted to be elevated and free the mold of its completed article or articles; furthermore, to provide means for causing a pause or halt in the upward movement of the die-carrying plunger whereby the mold is first moved a slight distance upwardly onto the dies, thereby forcing the completed article out of the mold and preventing it from adhering thereto, after which pause or halt said die-carrying plunger and mold are moved vertically in unison to allow of the withdrawal from under the mold and plunger of the completely-formed article; furthermore, to provide simple and novel means for moving the bottom section of the mold and its supported articles from under the elevated mold onto the delivery-table, and, finally, to construct a machine of this character which shall be comparatively simple of construction, durable in use, inexpensive of production, and of increased capacity.

With these and other objects in view the invention consists in certain features of construction and combination of parts, which will be hereinafter more fully set forth.

In the accompanying drawings, Fig. 13 is a plan view of the spider hereinafter referred to.

Referring to the drawings, 1 denotes the main supporting-frame, consisting of the parallel uprights connected at their upper ends by the arch-piece 2.

3 denotes a table which is secured rigidly between the uprights and has its ends projecting beyond the ends of the main frame. This table is preferably provided with longitudinal grooves or ways 4 for a purpose hereinafter to appear.

5 denotes a filling-box supported upon the table near its rear end and provided with a feed-hopper 6. This box is provided with longitudinal parallel guideways 7 and with a cut-off 8, which in the present instance consists of a horizontally-disposed board provided with a hole 8' and having a longitudinal movement in guide-grooves 9 and dividing the box into an upper and a lower compartment.

10 denotes the mold, which may be of any shape or configuration desired to adapt it to the particular style or shape of article desired to be pressed, and in the present instance is shown constructed for pressing brick, the mold being provided with eight pockets, whereby that number of bricks may be pressed at the same time. The mold is provided with a lug $10^3$, from which projects downwardly a pin $10^2$, which engages the hole 8' and locks the cut-off to the mold to move horizontally therewith, yet permitting of the independent vertical movement of the mold. The bottom 11 of the mold lies under the mold, but is not connected thereto, and is provided with longitudinal cleats 12, which slide and are guided in the longitudinal grooves in the top of the table.

13 denotes a yoke, one arm of which is mounted to slide in a vertically-elongated guide 14, bolted to the side of the main frame, and the other arm of which is provided with a head 15, rigidly connected to the front end of the mold. The yoke 13 is adapted to be reciprocated back and forth in a horizontal direction by means hereinafter described and yet at the same time by reason of the vertically-elongated bearings 14 may move up and down with the mold.

18 denotes a movable guide-frame comprising side pieces 19 and 20, which have on their inner sides guideways 21, registering or alining with the guideways 7 in the filling-box and designed to receive the guide-rollers 10', projecting from the sides of the mold. The side pieces of the guide-frame are provided with a stop 18' to limit the forward movement of the mold.

22 denotes a lever pivoted to the main frame at 23, and 24 denotes an elevating-frame for the movable guide-frame comprising a spider 25 and rods 26. The spider 25 has apertures 27, and the movable guide-frame has flanges 28, provided with apertures 29. Through these apertures of the spider and flanges are inserted the ends of the rods 26 and are fastened. The rods are guided in bearing-lugs 30, fixed to the main frame, so as to have a true vertical movement. A link 31 connects the spider to the inner end of the lever 22 to transmit the movement of said lever to the guide-frame.

32 denotes the die-carrying plunger, mounted to slide in ways 33 of the side pieces of the main frame. The dies 34 of the plunger in number and shape correspond to the compartments of the mold for obvious reasons. This plunger is reciprocated by an eccentric 35, mounted upon a shaft 36 and connected to the plunger by a strap-pitman 37, the lower end of which is provided with an elongated cross-pin bearing 38 to receive the cross-pin 39, the ends of which are mounted in cap-bearings 40, bolted to the plunger. By making the cross-pin-bearing aperture in the strap-pitman elongated lost motion is effected, the purpose of which will hereinafter appear.

41 denotes a yoke, one arm, 42, of which is mounted to reciprocate in a guide 43, secured to the side of the main frame, and the other arm, 44, of which is provided at its rear end with a spring-catch 45, which at a proper time is adapted to spring into engagement with the rear end of the mold-bottom and on the forward movement of the yoke 41 move said mold-bottom forwardly from under the plunger and the mold onto the forward or delivery end 46 of the table.

I will now proceed to describe the mechanism for moving the various parts thus far described.

47 denotes the main drive-shaft, mounted in suitable bearings 48 of the main frame and in a pillar-block 49. 50 denotes a drive-pulley fixed on said shaft, and 51 denotes a pinion which meshes with the gear-wheel 52, fixed to the shaft 53, mounted in bearings 54 of the main frame. This shaft 53 is provided with a pinion 55, which in turn meshes with a gear-wheel 56, fixed to the shaft 36.

57 denotes a counter-shaft journaled at the lower end of the main frame in bearings 58. 59 denotes a bevel-gear fixed to one end of the counter-shaft, and 60 denotes a single gear fixed to one end of the shaft 36.

A diagonally-disposed shaft 61 is mounted in suitable bearings 62, secured to the main frame and provided at its upper and lower ends with bevel gear-wheels 63 and 64, which mesh, respectively, with gears 60 and 59 and transmit movement from the shaft 36 to the shaft 57.

Figure 10:
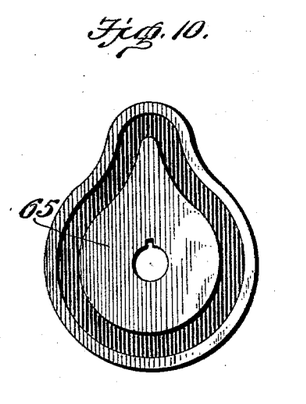
Fig. 10 is a plan view of one of the operating-cams.
Figures 11, 12:
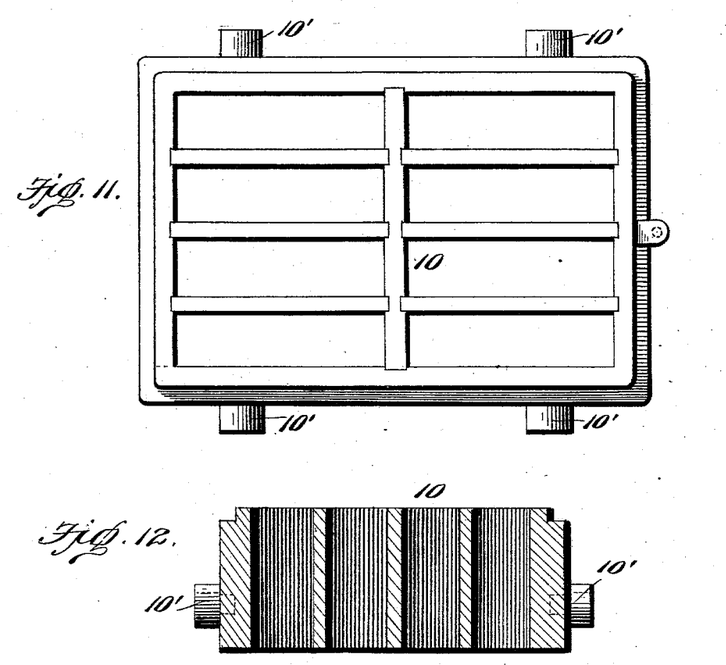
Fig. 11 is a plan view of the mold.
Fig. 12 is a vertical cross-section.
Figure 13:
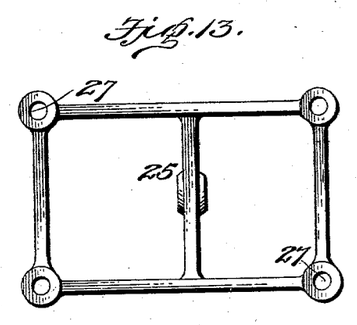
Figure 14:
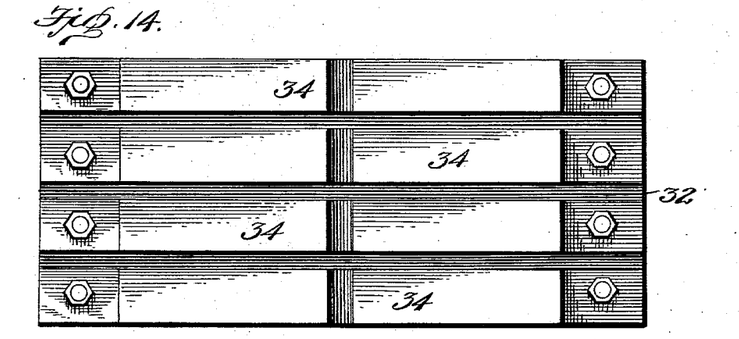
Fig. 14 is a bottom plan view of the die-carrying plunger.
Figure 15:
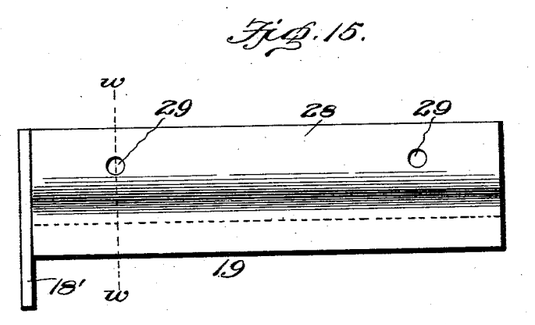
Fig. 15 is a plan view of one of the side pieces of the vertically-movable guides.
Figure 16:
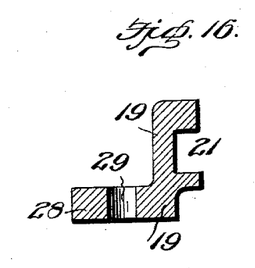
Fig. 16 is a sectional view on line $w\,w$, Fig. 15.

65, 66, and 67 denote cams fixed to the shaft 57, each cam being of the shape and contour shown in Fig. 10.

68 denotes a lever pivoted at a point intermediate its length to a stud 69, projecting from the main frame and having at its upper end a longitudinal aperture 70, into which projects a bearing-roller 71, projecting laterally from the outer arm or member of the yoke 13. The lower end of the lever is provided with a laterally-projecting roller 72, which engages the cam-slot of the cam 65, thus imparting a rocking movement to the lever and causing the reciprocation of the yoke 13 and the mold to which it is attached.

The lever 22 has its forward end provided with a laterally-projecting roller 22', which engages the groove of the cam 66, which in rotating will vertically reciprocate said lever and elevate the guide-frame and the mold carried thereby.

73 denotes a lever pivoted intermediate its ends to a stud 74, projecting from the side of the main frame and having at its lower end a roller 75, which engages the groove of the cam 67. The upper end of this lever is provided with an elongated slot 76, which engages a roller 77, carried by the arm or member 42 of the yoke 41, thus imparting to said yoke a reciprocatory movement.

Figure 1:
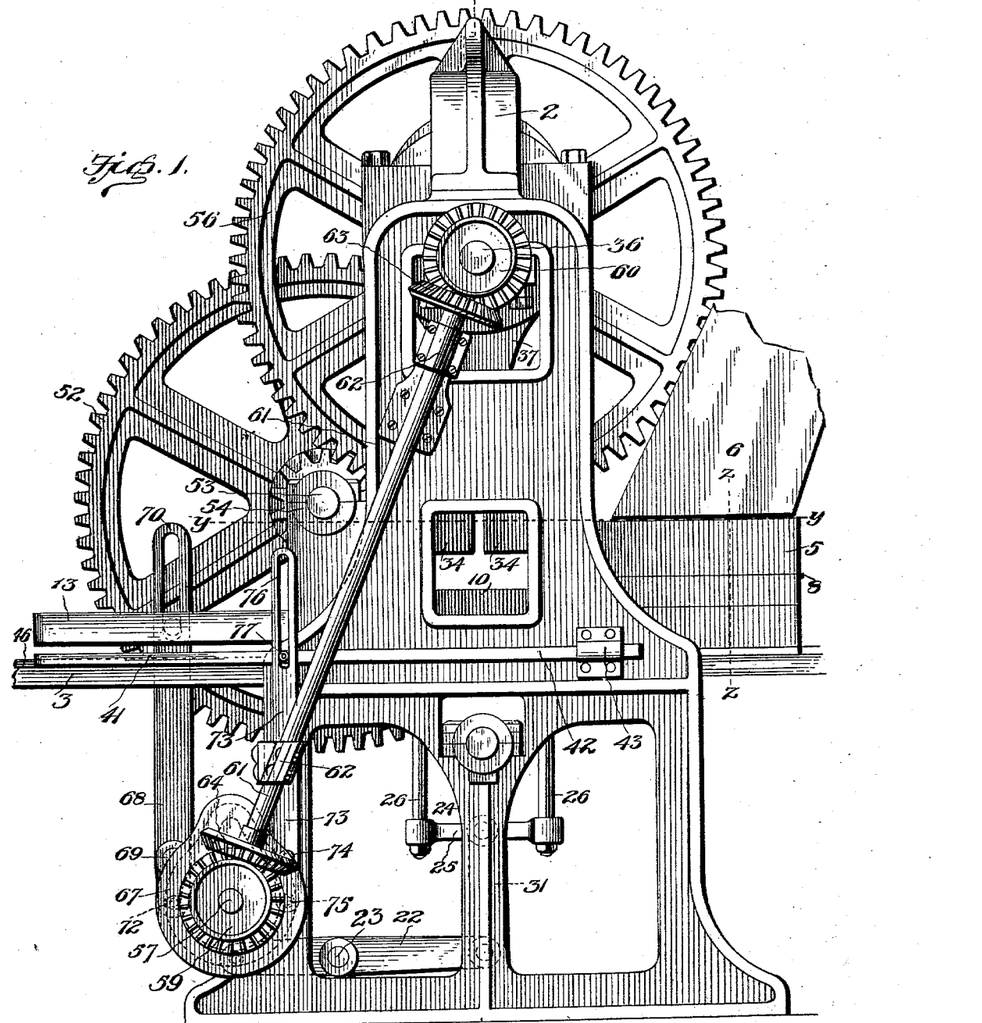
Figure 1 is a side elevation of my improved brick-machine.
Figure 2:
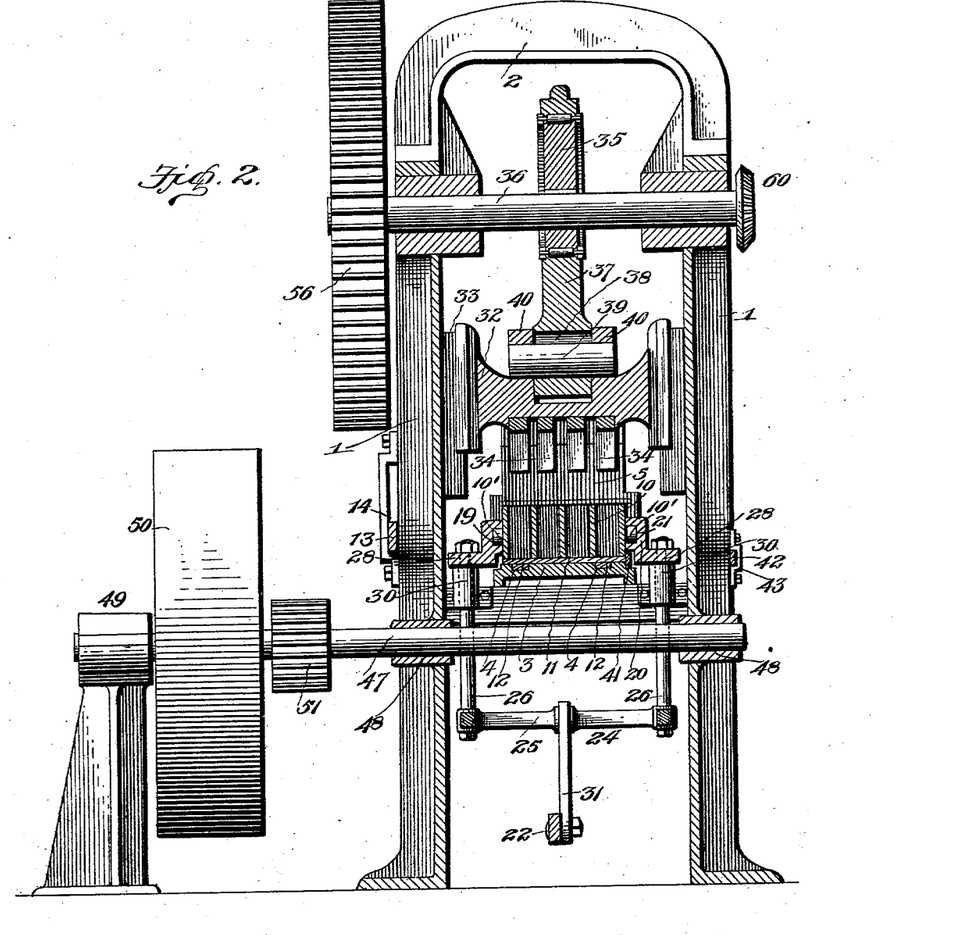
Fig. 2 is a central vertical sectional view on line $x\,x$, Fig. 1.
Figure 3:
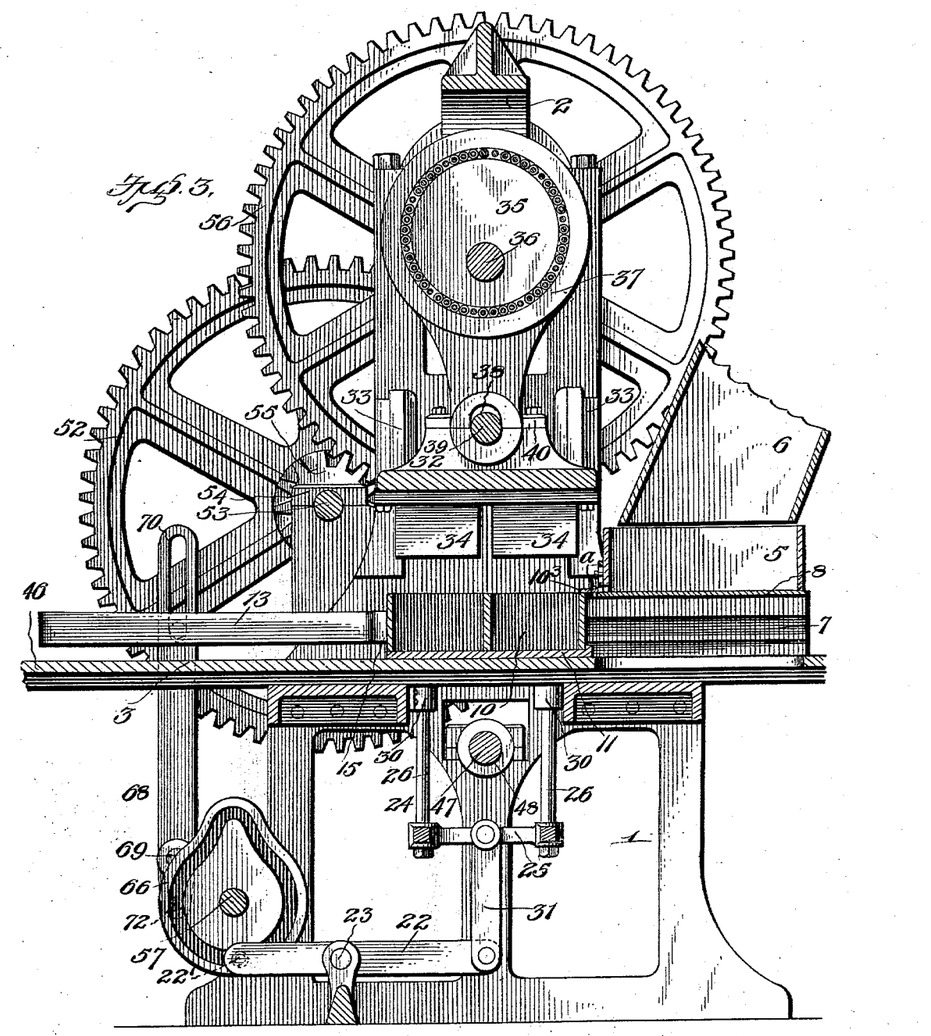
Fig. 3 is a longitudinal vertical sectional view.
Figures 4, 17:
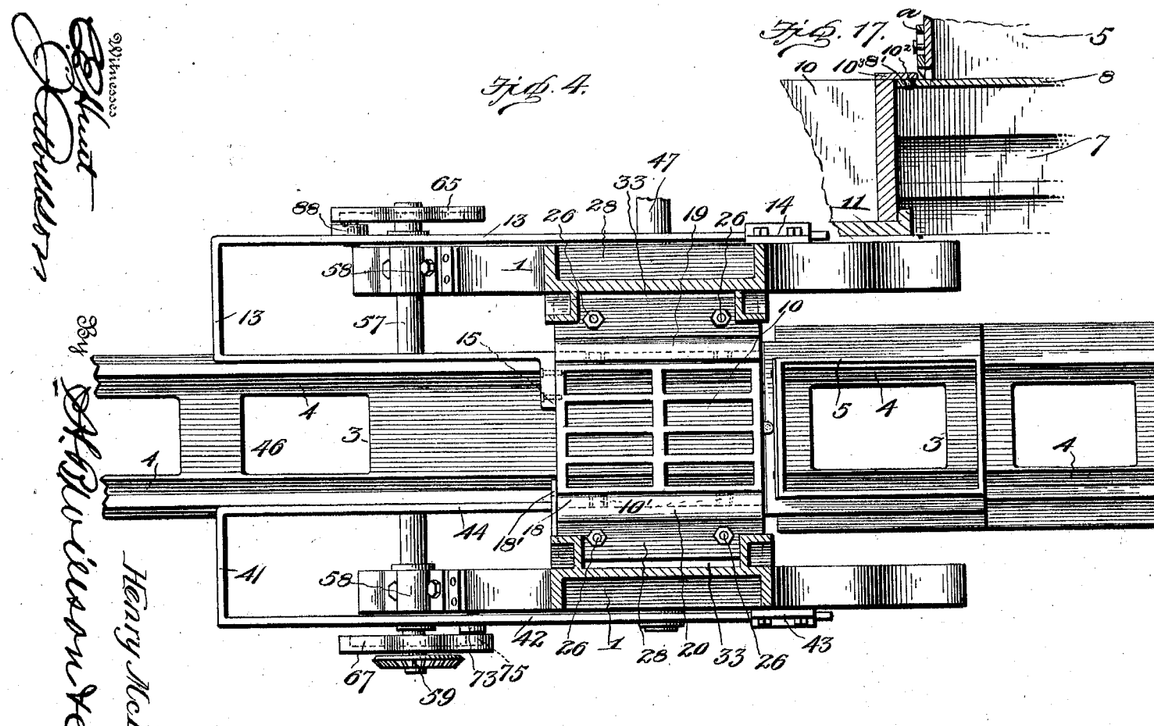
Fig. 4 is a horizontal sectional view on line $y\,y$, Fig. 1.
Fig. 17 is an enlarged fragmentary section of the mold and cut-off, illustrating the connection between the two.
Figure 5:
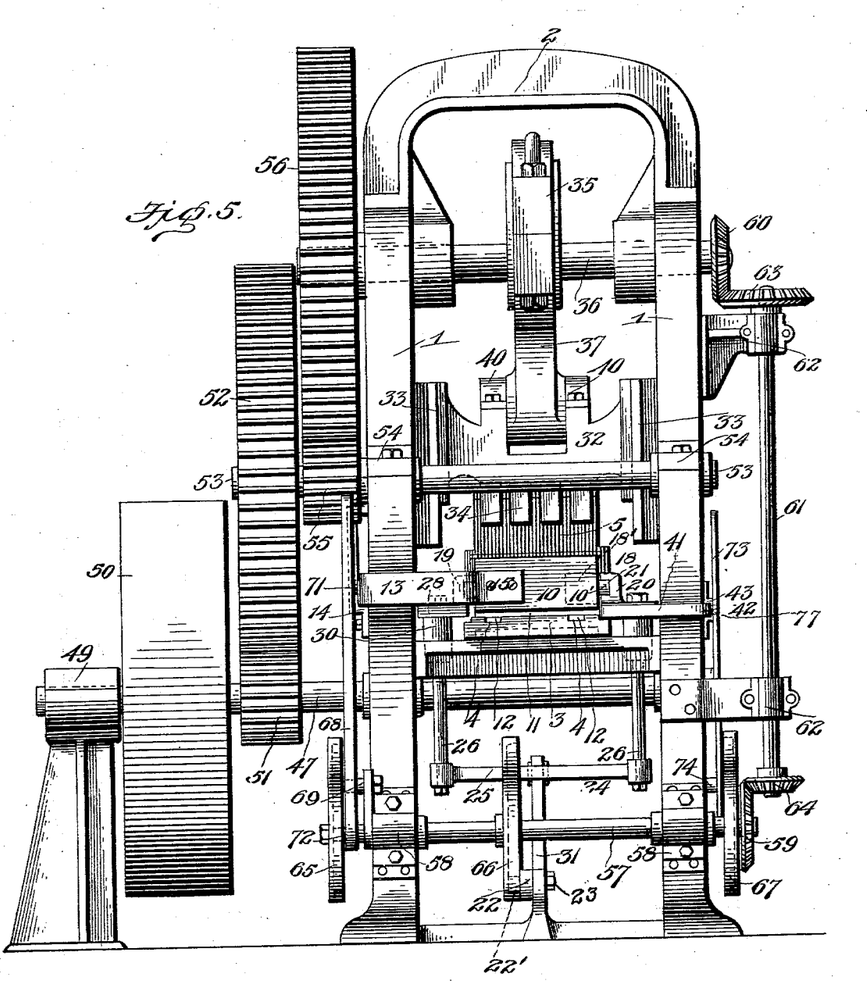
Fig. 5 is a front end elevation.
Figure 6:
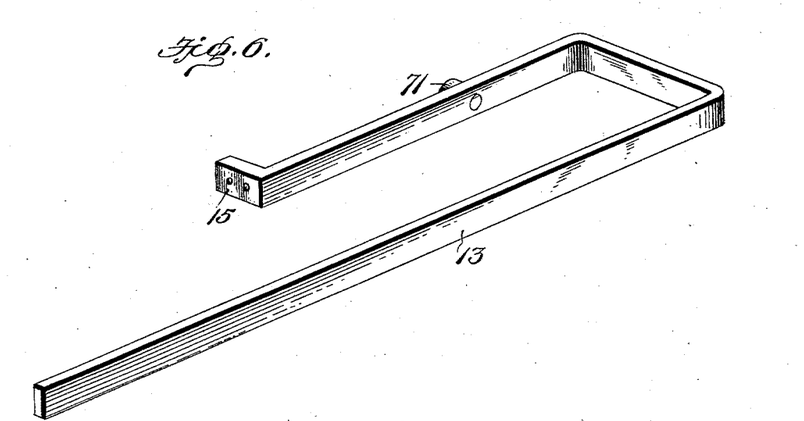
Fig. 6 is a detail perspective view of the yoke for reciprocating horizontally the mold.
Figure 7:
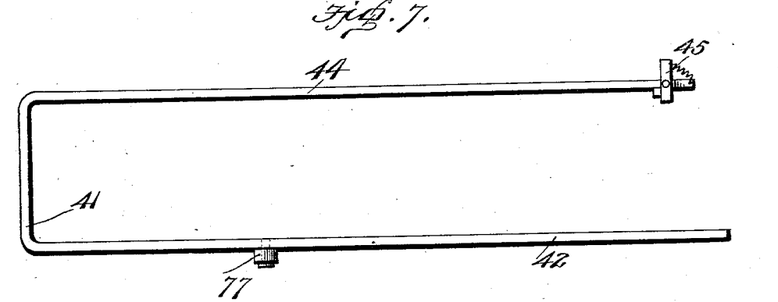
Fig. 7 is a plan view of the yoke for moving the completely-pressed articles from under the mold after said mold has been elevated.
Figure 8:
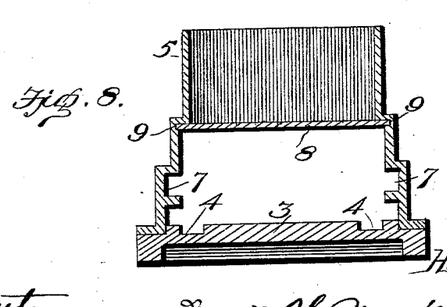
Fig. 8 is a vertical sectional view through lines $z\,z$, Fig. 1.
Figure 9:
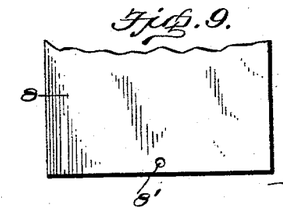
Fig. 9 is a detail view of one end of the cut-off board for the filling-box, showing the hole for the reception of the pin on the mold.

The operation of the machine is as follows: Assuming the parts of the machine to be in the position shown in Fig. 1, the drive-shaft 47 in motion, and the mold-bottom on the table under the filling-box, the lever 68 will be rocked rearwardly by its cam 65, and through the connection of the yoke 13 with the mold the latter will be moved rearwardly and being connected to the cut-off 8 will move said cut-off rearwardly through the rear end of the box, thus allowing the material in the box above the cut-off to fall or be discharged into the compartments of the mold. The lever 68 is now rocked by its cam in an opposite direction, withdrawing the mold from the box and at the same time drawing the cut-off 8 forward, thus closing the lower compartment of the filling-box and preventing the material entering the same, thus leaving said compartment unobstructed for the reëntrance therein of the mold upon its return stroke. In leaving the box the mold by the weight or frictional contact of the material therein draws with it the removable bottom, and as the mold passes forwardly the material in the mold is forced or smoothed down by an inclined knife-edge $a$, which is made adjustable to cause a greater or less pressure upon the material as the mold is being drawn from out of the box. The mold and its bottom, as above stated, is moved from out of the box and along the table, and when it reaches a point directly under the plunger it is stopped in its movement by the stop formed on the die-frame. The yoke 13 now arrives at a point of rest, and at this instant the die-carrying plunger is forced downwardly and the die forced into the different mold-compartments and compresses the material therein. At the instant the dies reach their greatest point of compression the guide-frame, with the mold carried thereby, starts to ascend, due to the movement imparted to the lever 22 by its cam 66, thus elevating the molds upon the dies, and thus preventing the bricks or other articles within the molds from adhering to the sides thereof and causing them to be discharged or remain upon the bottom of the mold. This movement of the guide-frame upward separates the mold from the cut-off 8 and takes place when the plunger is in its lowermost position, said plunger being allowed to come to a slight halt or pause before it is elevated by reason of making the bearing for the cross-head pin elongated by which the loss of motion is effected. Only temporarily and for an instant does the plunger remain stationary during the upward movement of the guide-frame. It remains in this position simply long enough to allow the mold to free itself from the pressed articles in its upward movement, and then both mold and plunger move vertically to a plane above the pressed article. At this instant the yoke 41, whose spring-catch has been engaged with the bottom of the mold by the advance movement of the mold from the filling-box, is moved forward, said spring-catch moving along with it the bottom of the mold, with its charge of pressed articles thereupon, and delivering them upon the forward or delivery end of the table, from which they are adapted to be removed by hand and from which the bottom of the mold is removed, carried around to the rear end of the machine, and inserted under the filling-box in a position to receive the mold in the manner above described. In the continued movement of the cam 67 the yoke 41 is returned to its normal position, with its catch in the path of movement of the next advancing mold-bottom to engage therewith and move it upon the delivery-table, as hereinbefore described. It will of course be understood that the movements of the different cams are so timed with respect to each other that the movements of the various parts of the machine actuated by said cams will not interfere one with the other.

From the foregoing description, taken in connection with the accompanying drawings, the construction, operation, and advantages of my invention will be readily understood without requiring an extended explanation. The device is exceeding useful for the purpose for which it is designed and may be placed upon the market at a comparatively small cost.

While I have shown and described a machine especially designed for making what is known in the art as "sand brick," a brick composed of sand and a binder therefor, which when removed from the machine requires no burning or baking and is ready for use, I would have it distinctly understood that I reserve to myself the right to adapt the machine to any character of presswork for which it may be found useful.

Having thus fully described my invention, what I claim as new, and desire to secure by Letters Patent, is—

1. In a machine of the character described, the combination with a horizontally-reciprocating mold, of a vertically-reciprocating plunger adapted to coact with said mold, means for reciprocating said mold in a horizontal plane, and means for reciprocating it in a vertical plane, substantially as set forth.

2. In a machine of the character described, the combination with a horizontally and vertically reciprocatory mold, of a vertical reciprocatory plunger designed to coact with said mold, means for forcing the plunger down into the mold, means for imparting an initial upward movement to the mold while the plunger is within the same, and means for continuing the initial upward movement and simultaneously moving the plunger and mold vertically at the same time, substantially as set forth.

3. In a machine of the character described, the combination with a horizontally and vertically reciprocatory mold, of a vertically-reciprocatory plunger to coact with said mold, means for elevating the mold independently of the plunger when the plunger is within the mold, and means for elevating the plunger at the same time with the mold after the mold has first been moved independently of the plunger a predetermined distance, substantially as set forth.

4. In a brick-machine, the combination with a vertically-movable guide-frame and a horizontally-reciprocatory mold, means for operating the said guide-frame, means for reciprocating the mold in and out of the guide-frame, and means for reciprocating the guide-frame when the mold is therein, substantially as set forth.

5. In a brick-machine, the combination with a vertically-movable guide-frame and a horizontally-reciprocatory mold, means for operating the said guide-frame, means for reciprocating the mold in and out of the guide-frame, and means for elevating the guide-frame with the mold therein and at the same time with the plunger, substantially as set forth.

6. In a machine of the character described, the combination with a horizontally and vertically reciprocatory mold having a removable bottom, and a plunger coacting with said mold, of means for moving the bottom from under the plunger after the mold has been elevated from said bottom, substantially as set forth.

7. In a machine of the character described, the combination with a horizontally and vertically reciprocatory mold having a removable bottom, and a plunger coacting with said mold, of means for automatically moving the bottom from under the plunger after the mold has been elevated from said bottom, substantially as set forth.

8. In a machine of the character described, the combination with the main frame provided with a supporting-table, of a filling-box supported thereon, a horizontally and vertically movable mold provided with a removable bottom adapted to work through said box and be charged with the material to be pressed, a cut-off for said box actuated by the movement of the mold into the box to allow the material to be discharged within the mold and cut off by the movement of the mold from out of the box to prevent the discharge of material into the space formerly occupied by the mold, a vertically-reciprocating plunger to coact with said mold, means for moving the mold horizontally, and means for moving it vertically.

9. The combination with a supporting-table, of a filling-box mounted thereon and provided with a cut-off, a mold adapted to slide upon said supporting-table into the box under the cut-off, and means for automatically connecting the mold to and disconnecting it from the cut-off to open the cut-off and allow the material in the filling-box to discharge into the mold as said mold advances into the box and to close said cut-off as said mold withdraws from the box, thereby preventing the discharge of the mold into the space occupied by the mold within said box, substantially as set forth.

10. In a machine of the character described, the combination with the main frame and its supporting-table, of a filling-box mounted upon the table and provided with guideways, a vertically-movable guide-frame having guideways registering with and forming a continuation of the first-named guideways, a mold having guide-rollers to engage said guideways, a coacting plunger for said mold, means for reciprocating the mold horizontally, and means for raising and lowering the guide-frame, substantially as set forth.

11. In a machine of the character described, the combination of the main frame and the supporting-table, a filling-box supported by said table at one end thereof, a mold mounted to slide horizontally with respect to the table and provided with a removable bottom, a vertically-movable guide-frame, a plunger coacting with the mold, means for moving the mold into and from the filling-box to a position under the plunger, means for forcing the plunger downward within the mold while in this position, means for starting the mold in an upward direction while the plunger is within the mold, means for elevating the plunger at the same time with the mold after the mold has first moved a predetermined distance upwardly, and means for withdrawing the removable bottom with its charge of pressed articles from under the mold after it has been elevated, substantially as set forth.

12. In a machine of the character described, the combination with the main frame and its supporting-table, a filling-box supported by said table and provided with longitudinal guideways, a vertically-reciprocatory guide-frame having guideways which register with the first-named guideways and form a continuation thereof and are provided with a stop, of a horizontally-reciprocatory mold having studs to engage said guideways, a coacting plunger, means for pressing the plunger down within the mold, means for elevating the mold, and for elevating the plunger, and means for removing the pressed articles from under the mold after said mold has been elevated, substantially as set forth.

13. In a machine of the character described, the combination with the main frame and its supporting-table, of a horizontally and vertically movable mold, a plunger coacting with said mold, means for moving the mold vertically, and means for moving the mold laterally, said means comprising a rocking lever and a bar, the bar having a connection with the mold, and a loose vertical connection with the lever, substantially as set forth.

In testimony whereof I have hereunto set my hand in presence of two subscribing witnesses.

HENRY McINTOSH.

Witnesses:
MABEL L. WARNER,
DAVID A. FITZGIBBON.